3,037,020
PROCESS FOR THE PREPARATION OF SUBSTITUTED 17α - HYDROXY - 16α - METHYL - PREGNANE-3,20-DIONES
Gérard Nominé, Noisy-le-Sec, France, assignor, by mesne assignments, to Roussel-UCLAF, S.A., Paris, France, a corporation of France
No Drawing. Filed Jan. 13, 1960, Ser. No. 2,115
Claims priority, application France Jan. 23, 1959
9 Claims. (Cl. 260—239.5)

The present invention relates to the synthesis of steroids.

It is the object of the present invention to prepare pregnane diones of the general formula:

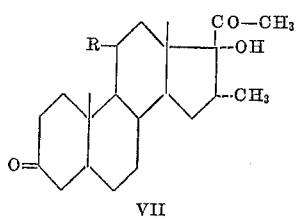

VII wherein

or O, by a process which comprises converting the known compound $\Delta^{16(17)}$ - pregnene - 3,11,20 - trione through a series of new intermediates into the desired pregnane diones of Formula VII.

The pregnane diones of Formula VII are useful as intermediates in the preparation of the known compound hexadecadrol (16α - methyl - 9α - fluoro - prednisolone). When

Compound VII is transformed into 17α,21-dihydroxy-16α - methyl - $\Delta^{9(11)}$ - pregnene - 3,20 - dione by dehydration in the 9,11-position and microbiological hydroxylation in the 21-position, particularly by the enzymatic action of *Colletotrichum lindemuthianum* (ATCC 12611) as described in U.S. Patent No. 2,805,978, issued September 10, 1957. In addition, the compound can be acetyloxylated in the 21-position by known chemical means. The $\Delta^{9(11)}$-pregnene-21-ol is acetylated in the 21-position in accordance with known processes, and then dehydrogenated, for example by conventional microbiological procedures, to create double bonds in the 1,2 and 4,5-positions, thereby yielding 17α-hydroxy-21-acetoxy - 16α - methyl - $\Delta^{1,4,9(11)}$ - pregnatriene - 3,20 - dione (described by Oliveto et al., J. Am. Chem. Soc., 80, 4431 (1958), which in turn is converted to hexadecadrol by formation of the fluorohydrin (the 9α-fluoro-11β-hydroxy derivative).

When R=O, dibromination of Compound VII in dioxane or ethyl acetate readily yields 17α-hydroxy-16α-methyl-2,4-dibromo-pregnane - 3,11,20 - trione, which in turn is converted to hexadecadrol by the method described in commonly assigned application Serial No. 861,783, filed December 24, 1959, and entitled "Process for the Preparation of Substituted Cortico Steroids."

In accordance with the process of the present invention, the substituted pregnane diones of Formula VII are obtained according to the reaction diagram of Table I.

TABLE I

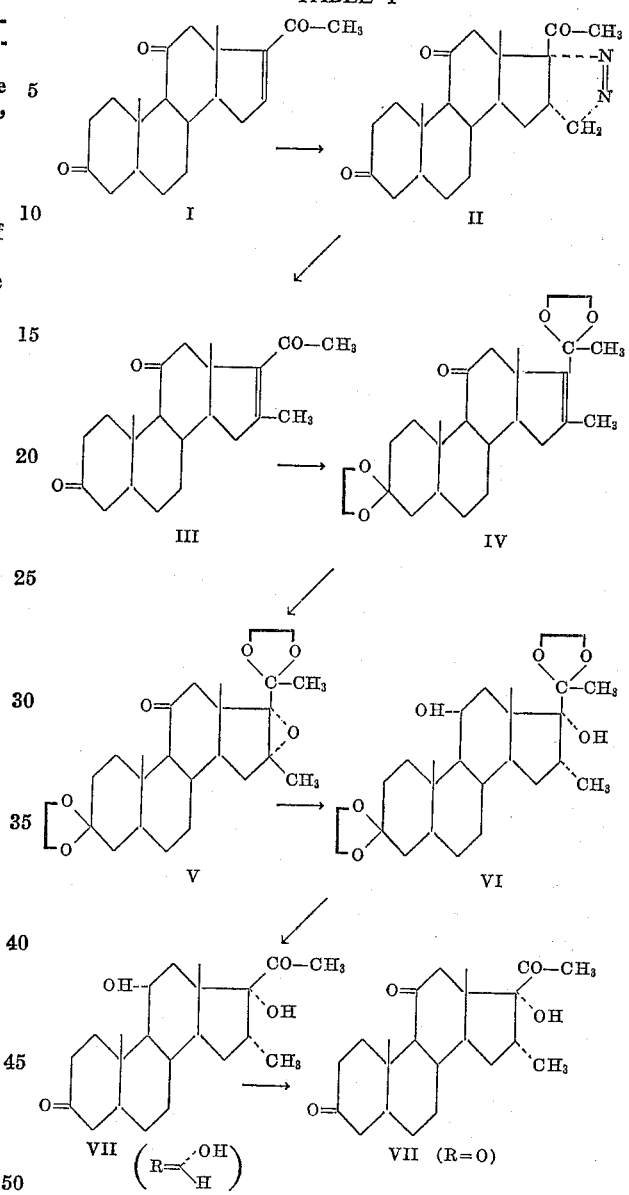

The starting material $\Delta^{16(17)}$ - pregnene- 3,11,20 - trione (I) described in J. Am. Chem. Soc., 73, 4765 (1951), is condensed with diazomethane in an inert solvent (such as a halogenated hydrocarbon, benzene, toluene or ether). The pyrazoline (II) formed thereby is subjected to thermolysis either by heating alone or in a high boiling solvent such as xylene, tetralin, decalin or glycol ethers to yield 16-methyl-$\Delta^{16(17)}$ - pregnene - 3,11,20 - trione (III). The trione (III) is then transformed into the 3,20-diketal derivative by known procedures, such as by reaction with an alcohol, a lower alkylene glycol such as ethylene glycol, or a mercapto alcohol such as 2-mercapto ethanol, in the presence of a strong acid such as perchloric acid or p-toluene-sulfonic acid, and elimination of the water formed by azeotropic distillation; or, alternatively, by double exchange of radicals with the ketal of a lower alkyl ketone; or, finally, by heating with a lower alkyl orthoformate. The diketal IV thus obtained is then reacted with an organic percarboxylic acid in an inert organic solvent, yielding the 3,20-diketal of 16α,17α-epoxy-16β-methyl-pregnane-3,11,20-trione (V). For an organic percarboxylic acid, there can be employed lower peralkanoic acids such as peracetic acid and performic acid, or aromatic hydrocarbon percarboxylic acids such as perphthalic acid and perbenzoic acid. Perphthalic acid is preferable. Any inert organic solvent such as the chlorinated hydrocarbons, ether, benzene, etc., can be employed. The trione V is then reacted at a low temperature with an alkali metal such as lithium in the presence of a lower alkylamine such as ethylamine or methylamine. The epoxy group is saponified and simultaneously the keto function in the 11-position is reduced and through steric inversion there is obtained the 3,20-diketal of 11α,17α-dihydroxy - 16α - methyl - pregnane - 3,20-dione (VI). The latter is subjected to conventional acid hydrolysis to cleave the ketal and yield 11α,17α-dihydroxy-16α-methyl-pregnane-3,20-dione, Compound VII, wherein

By oxidation the latter derivative is transformed into 17α-hydroxy - 16α - methyl - pregnane - 3,11,20 - trione VII, wherein R=O. This oxidation can be done by any procedure known in steroid chemistry, such as with chromic acid in solution in acetic acid.

The following examples illustrate the present invention without limiting it. The temperatures are expressed in degree C., and the melting points are instantaneous melting points determined on a Maquenne block.

*Example 1*

PREPARATION OF 11α,17α-DIHYDROXY-16α-METHYL-PREGNANE-3,20-DIONE (VII)

wherein 

*Stage 1.*—Preparation of the 16,17-pyrazoline derivative of Δ$^{16(17)}$-pregnene-3,11,20-trione (II). 5 gms. of Δ$^{16(17)}$-pregnene-3,11,20-trione dissolved in 20 cc. of methylene chloride are introduced while stirring into 403 cc. of a solution containing 9.5 gms. of diazomethane per liter of methylene chloride, cooled to 0° C. on an ice bath. The ice bath is removed and the reaction mixture is allowed to stand at room temperature overnight. The excess diazomethane is then destroyed by adding 6 cc. of acetic acid while cooling. The solution becomes colorless. The methylene chloride is driven off in vacuo on a steam bath, and the residue is recrystallized from ethanol to yield a first crop of 5 gms. (88% yield) of needle-like crystals of the 16,17-pyrazoline derivative of Δ$^{16(17)}$-pregnene-3,11,20-trione (II). Compound II has a melting point of 203° C. (with decomposition) and a specific rotation of $[α]_D^{20}=+142°$ (c.=1% in chloroform). It is very soluble in methylene chloride, chloroform, dichloroethane, benzene and toluene, slightly soluble in the cold in ether, isopropyl ether, ethanol and methanol, and slightly more soluble in acetone and ethyl acetate. It gives the following elemental analysis:

*Analysis.* — $C_{22}H_{30}O_3N_2$; molecular weight = 370.48. Calculated: C, 71.32%; H, 8.16%; N, 7.56%. Found: C, 71.5%; H, 8.0%; N, 7.7%.

This compound is not described in the literature.

*Stage 2.*—Preparation of 16-methyl - Δ$^{16(17)}$ - pregnene-3,11,20-trione. 2.5 gms. of the 16,17-pyrazoline derivative of Δ$^{16(17)}$-pregnene-3,11,20-trione, prepared according to the preceding stage, and 15 cc. of tetralin are heated slowly so that refluxing begins after about twenty minutes, and the mixture is refluxed for ½ hour, after which the solvent is driven off by steam distillation. The crude product is extracted with methyl chloride. The extract is washed with water, dried over anhydrous sodium sulfate, filtered and evaporated to dryness. The evaporation residue is triturated with 10 cc. of hot isopropyl ether, vacuum filtered and dried to give 1.6 gms. (70% yield) of 16-methyl-Δ$^{16(17)}$-pregnene-3,11,20-trione (III). This product is of sufficient purity to be used directly in subsequent operations. For analysis, the crude compound is recrystallized from acetone to give crystals having a melting point of 175° C. and a specific rotation of $[α]_D^{20}=+57.7°$ (c.=1% in chloroform). The compound is very soluble in chloroform, slightly soluble in the cold in acetone, ethanol and methanol. Ultraviolet spectrum shows $λ_{max.}=248$ mμ; ε=9,350 (ethanol).

*Analysis.*—$C_{22}H_{30}O_3$; molecular weight=342.46. Calculated: C, 77.15%; H, 8.83%. Found: C, 77.4%, H, 8.8%.

This compound is not described in the literature.

*Stage 3.* — Preparation of 3,20-di(ethylene-dioxy)-16-methyl-Δ$^{16(17)}$-pregnene-11-one (IV). A mixture of 15 gms. of the product III prepared according to stage 2, 600 cc. of anhydrous benzene, 1 cc. of a 65% aqueous solution of perchloric acid and 30 cc. of ethylene glycol is heated under reflux. The refluxing benzene is freed of azeotropically entrained water prior to being returned to the reaction mixture. 5 cc. of ethylene glycol are added every hour over a period of three hours of refluxing, and then the refluxing is continued for an additional two hours. Subsequently, the reaction mixture is cooled, 2 gms. of sodium bicarbonate are added and the resulting mixture is stirred overnight. The reaction mixture is then poured into water. The benzene phase is decanted, washed with water until neutral, dried over anhydrous magnesium sulfate, filtered and evaporated to dryness in vacuo. The residue, consisting of 3,20-di(ethylenedioxy)-16-methyl-Δ$^{16(17)}$-pregnene-11-one (IV) is carefully freed from benzene and recrystallized from methanol containing 2% pyridine to give 10 gms. (53% yield) of the compound IV. Compound IV has a melting point of 146° C. and a specific rotation of $[α]_D^{20}=+49°$ (c.=1% in chloroform). It is soluble in benzene, slightly soluble in methanol and ethanol, and insoluble in water. For analysis, the compound is desolvated by slow recrystallization from the same solvent mixture and dried under vacuum.

*Analysis.*—$C_{26}H_{38}O_5$; molecular weight=430.56. Calculated: C, 72.52%; H, 8.9%. Found: C, 72.5%; H, 8.8%.

This compound is not described in the literature.

*Stage 4.*—Preparation of 16α,17α - epoxy - 16β-methyl-3,20-di(ethylene-dioxy)-pregnane-11-one (V). 5 gms. of the diketal IV obtained as described in the preceding stage are dissolved while stirring in 40 cc. of dichloroethane. The solution is cooled to 15° C. and, while continuing the agitation and maintaining the temperature of the reaction mixture between 15 and 20° C. by external cooling, 15 cc. of an ethereal solution of perphthalic acid containing 20 gms. of perphthalic acid per 100 cc. of solution, is added. When the addition of the peracid is completed, the agitation is stopped and the reaction mixture is allowed to stand for 16 hours. The phthalic acid which separates out is filtered off and the filtered solution is washed with an aqueous solution of sodium bisulfite, then with a saturated solution of sodium bicarbonate until the wash water is alkaline, and finally with water until neutral. The organic phase is then dried over magnesium sulfate, filtered and evaporated to dryness. The residue is dissolved in approximately 16 cc. of boiling ethanol and allowed to crystallize by cooling. The crystals of epoxide which are formed are vacuum filtered and the filter cake is recrystallized from ethanol. After vacuum filtering and drying there is obtained 4.6 gms. (88.5% yield) of 16α,17α-epoxy-16β-methyl - 3,20-di(ethylene-dioxy)-pregnane-11-one (V). Compound V has a melting point of 161° C. and a specific rotation of $[α]_D^{20}=+380°$ (c=1% in chloroform).

*Analysis.*—$C_{26}H_{38}O_6$; molecular weight=446.56. Calculated: C, 69.92%; H, 8.57%. Found: C, 70.0%; H, 8.4%.

This compound is not described in the literature.

*Stage 5.*—Preparation of 3,20 - di(ethylene - dioxy)-11α,17α-dihydroxy-16α-methyl-pregnane (VI). 1 gm. of 16α,17α-epoxy - 16β - methyl - 3,20-di(ethylene-dioxy)-pregnane-11-one (V), obtained in the preceding stage, is dissolved with mechanical agitation in 200 cc. of anhydrous ethylamine in an atmosphere of nitrogen. After cooling the solution to −20° C., 0.3 gm. of lithium is added all at once. Within 5 minutes of agitation under nitrogen, the color of the reaction mixture turns from yellow to orange and then to permanent deep blue. After 1 hour of agitation at −20° C. in an atmosphere of nitrogen, the reaction mixture turns colorless; at this time approximately 5 gms. of ammonium chloride are added until a completely clear solution is obtained. The ethylamine is driven off in vacuo in the cold and still under an atmosphere of nitrogen and 200 cc. of water are added to the residue. The 3,20-di(ethylene-dioxy)-11α,17α-dihydroxy-16α-methyl-pregnane (VI) thus obtained is insoluble in water and is filtered off on a vacuum filter, washed with water and again vacuum filtered. It is a white product which melts at about 140° C. and is used as such for the next stage.

*Stage 6.*—Preparation of 11α,17α - dihydroxy - 16α-methyl-pregnane-3,20-dione (VII) wherein

0.6 gm. of 3,20-di(ethylene-dioxy)-11α,17α-dihydroxy-16α-methyl-pregnane (VI), produced according to the preceding stage and still moist, is dissolved in 10 volumes of an 80% aqueous acetic acid solution and the resulting solution is heated for 2½ hours at 80° C. in a stream of nitrogen. After cooling, the solution is precipitated with water and the suspension formed thereby is extracted with ether. The ether extract solution is first washed with a solution of sodium bicarbonate, then with water until the pH of the wash water is neutral. Then it is dried over anhydrous sodium sulfate, filtered and evaporated to dryness to give a 0.45 gm. (61% overall yield for stages 5 and 6) of 11α,17α-dihydroxy-16α-methyl-pregnane-3,20-dione of Formula VII wherein

After recrystallization from ethyl acetate Compound VII, wherein

has a melting point of 198° C. and a specific rotation of $[\alpha]_D^{20} = -12.5°$ (c.=1% in chloroform). It is soluble in chlorinated solvents, ethyl acetate, acetone and ethanol, slightly soluble in isopropyl ether and insoluble in cyclohexane and water.

*Analysis.*—$C_{22}H_{34}O_4$; molecular weight=362.49. Calculated: C, 72.89%; H, 9.45%. Found: C, 73.0%; H, 9.5%.

This compound is not described in the literature.

*Example II*

PREPARATION OF 17α-HYDROXY-16α-METHYL-PREGNANE-3,11,20-TRIONE (VII)

wherein R=O.

0.5 gm. of Compound VII wherein

is oxidized with chromic acid in acetic acid according to the customary process. Thereafter, the mixture is poured into water and the pregnane trione is extracted with ether. The ether extract is washed with dilute acetic acid, with sodium bicarbonate and with water until the wash water is neutral, and is finally dried over anhydrous sodium sulfate. After filtration the solution is evaporated to dryness, giving 0.46 gm. (92% yield) of 17α-hydroxy-16α-methyl - pregnane - 3,11,20-trione (VII wherein R=O). The compound is purified by recrystallization from ethyl acetate. It has a melting point of 204° C.

The above example is non-limiting and it is evident that the temperature and/or the solvents may be varied and that other equivalent techniques known to those in the art may be used without departing from the spirit of the invention. Thus, in place of perphthalic acid, it is possible to use peracetic acid, performic acid, or perbenzoic acid; or to use 2-mercaptoethanol in place of ethylene glycol for the formation of the cyclic ketal; to use another lower alkylamine instead of ethylamine or methylamine for opening the epoxide linkage; to use another acid than acetic for the cleavage of the ketal; and to use another oxidizing agent for formation of Compound VII wherein R=O. These and other expedients known to those skilled in the art may be employed in the practice of the invention without departing from the spirit of the invention or the scope of the appended claims.

I claim:

1. The 16α,17α-pyrazoline derivative of $\Delta^{16(17)}$-pregnene-3,11,20-trione.

2. 3,20 - di(ethylene - dioxy) - 16 - methyl - $\Delta^{16(17)}$ - pregnene-11-one.

3. 3,20 - di(ethylene - dioxy) - 16α,17α - epoxy - 16β - methyl-pregnane-11-one.

4. 3,20 - di(ethylene - dioxy) - 11α,17α - dihydroxy - 16α-methyl-pregnane.

5. The process for the preparation of a pregnanedione having the formula

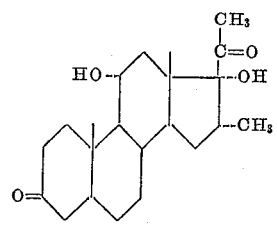

which comprises the steps of (*a*) reacting $\Delta^{16(17)}$-pregnene-3,11-20-trione in an inert organic solvent with diazomethane, (*b*) heating the 16α,17α-pyrazoline derivative of $\Delta^{16(17)}$-pregnene-3,11,20-trione to effect thermolysis, (*c*) reacting the 16-methyl-$\Delta^{16(17)}$-pregnene-3,11,20-trione with a ketalizing agent selected from the group consisting of lower aliphatic alcohols, lower alkylene glycols, lower aliphatic mercapto alcohols and lower alkyl orthoformates, (*d*) oxidizing the 3,20-diketal of 16-methyl-$\Delta^{16(17)}$-pregnene-3,11,20-trione with an organic percarboxylic acid in an inert solvent, (*e*) reacting the 3,20-diketal of 16α,17α-epoxy-16β-methyl-pregnane-3,11,20-trione with an alkali metal in the presence of a lower alkyl amine at a temperature between 0° and −40° C., (*f*) hydrolyzing the 3,20-diketal of 11α,17α-dihydroxy-16α-methyl-pregnane-3,20-dione by heating in the presence of an acid to form 11α,17α-dihydroxy-16α-methyl-pregnane-3,20-dione, and (*g*) and recovering said pregnanedione.

6. The process of claim 5 wherein, in step (*c*), the ketalizing agent is an alcohol in the presence of perchloric acid.

7. The process of claim 5 wherein, in step (*d*), the organic percarboxylic acid is perphthalic acid.

8. The process of claim 5 wherein, in step (*e*), the reaction causing the opening of the 16,17-epoxide linkage and stearic inversion of the 16-methyl from the β to the α orientation is effected with metallic lithium in an aliphatic amine selected from the group consisting of ethylamine and methylamine at temperatures between 0° and −40° C.

9. The process for the preparation of a pregnane-trione of the formula

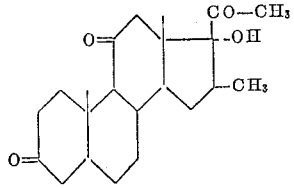

which comprises the steps of (a) reacting $\Delta^{16(17)}$-pregnene-3,11,20-trione in an inert organic solvent with diazomethane, (b) heating the 16,17-pyrazoline derivative of $\Delta^{16(17)}$-pregnene-3,11,20-trione to effect thermolysis, (c) reacting the 16-methyl-$\Delta^{16(17)}$-pregnene-3,11,20-trione with ketalizing agent selected from the group consisting of lower aliphatic alcohols, lower alkylene glycols, lower aliphatic mercapto-alcohols, and lower alkyl orthoformates, (d) oxidizing the 3,20-diketal of 16-methyl-$\Delta^{16(17)}$-pregnene-3,11,20-trione with an organic percarboxylic acid in an inert organic solvent, (e) reacting the 3,20-diketal of 16α,17α-epoxy-16β-methyl-pregnane-3,11,20-trione with an alkali metal in the presence of a lower alkylamine at a temperature between 0° and —40° C., (f) hydrolyzing the 3,20-diketal of 11α,17α-dihydroxy-16α-methyl-pregnane-3,20-dione by heating in the presence of an acid to obtain 11α,17α-dihydroxy-16α-methyl-pregnane-3,20-dione, (g) oxidizing 11α,17α-dihydroxy-16α-methyl-pregnane-3,20-dione with a solution of chromic acid in acetic acid to form 16α-methyl-17α-hydroxy-pregnane-3,11,20-trione, and (h) recovering said pregnane-trione.

References Cited in the file of this patent
UNITED STATES PATENTS

| | | |
|---|---|---|
| 2,705,233 | Julian | Mar. 29, 1955 |
| 2,708,672 | Magerlein et al. | May 17, 1955 |
| 2,740,783 | Hogg et al. | Apr. 3, 1956 |
| 2,751,379 | Sondheimer et al. | June 19, 1956 |
| 2,751,400 | Nathan | June 19, 1956 |

OTHER REFERENCES

Nes et al.: J.A.C.S., 73, 4765–4766 (1951).
Oliveto et al.: 80 J.A.C.S., 4428 (1958).
Slates et al.: 81 J.A.C.S., 5472–75 (1959).